(12) United States Patent
McGeachy et al.

(10) Patent No.: US 11,663,664 B2
(45) Date of Patent: *May 30, 2023

(54) SWITCHING LAYER FOR TRADING ON GLOBAL MARKETS

(71) Applicant: FIDESSA TRADING UK LIMITED, London (GB)

(72) Inventors: Mark McGeachy, Surrey (GB); Philip Beevers, Aldershot (GB); John Murphy, Surrey (GB); Marc Cousins, Surrey (GB)

(73) Assignee: FIDESSA TRADING UK LIMITED, London (GB)

( * ) Notice: Subject to any disclaimer, the term of this patent is extended or adjusted under 35 U.S.C. 154(b) by 8 days.

This patent is subject to a terminal disclaimer.

(21) Appl. No.: 16/018,327

(22) Filed: Jun. 26, 2018

(65) Prior Publication Data

US 2018/0300812 A1 Oct. 18, 2018

Related U.S. Application Data

(63) Continuation of application No. 14/546,151, filed on Nov. 18, 2014, now Pat. No. 10,032,220.

(60) Provisional application No. 61/905,662, filed on Nov. 18, 2013.

(51) Int. Cl.
*G06Q 40/04* (2012.01)
(52) U.S. Cl.
CPC .................................. *G06Q 40/04* (2013.01)
(58) Field of Classification Search
None
See application file for complete search history.

(56) References Cited

U.S. PATENT DOCUMENTS

| | | | | |
|---|---|---|---|---|
| 6,278,982 B1* | 8/2001 | Korhammer | ........... | G06Q 40/04 705/36 R |
| 6,347,307 B1* | 2/2002 | Sandhu | .................. | G06Q 40/00 705/36 R |
| 7,801,806 B2* | 9/2010 | Burns | .................. | G06Q 20/382 705/37 |
| 2009/0276348 A1* | 11/2009 | Kessler | .................. | G06Q 40/04 705/37 |
| 2011/0258629 A1* | 10/2011 | Dantzig | ................. | G06Q 40/04 718/100 |

(Continued)

OTHER PUBLICATIONS

U.S. Appl. No. 14/546,151 (U.S. Pat. No. 10,032,220), filed Nov. 18, 2014 (Jul. 24, 2018).

(Continued)

*Primary Examiner* — Eric T Wong
(74) *Attorney, Agent, or Firm* — Baker Botts L.L.P.

(57) ABSTRACT

Techniques for managing and routing market orders across a global trading system. Each trading node can be associated with one or more markets and each node can be configured to provide market access to each market associated with a node in the system. Each trading node can be connected, via a network, to a global switching layer. The global switching layer can route requests, such as orders and the like, from an end user associated with one of the plurality of nodes to a corresponding exchange or market. The global switching layer can be configured to dynamically provide, to each end user, a user interface element corresponding to each trading node.

30 Claims, 7 Drawing Sheets

(56) References Cited

U.S. PATENT DOCUMENTS

2016/0140661 A1* 5/2016 Rooney ............... G06Q 40/04
705/37

OTHER PUBLICATIONS

U.S. Appl. No. 14/546,151, Jun. 26, 2018 Issue Fee Payment.
U.S. Appl. No. 14/546,151, Apr. 4, 2018 Notice of Allowance.
U.S. Appl. No. 14/546,151, Feb. 21, 2018 Response to Non-Final Office Action.
U.S. Appl. No. 14/546,151, Oct. 24, 2017 Non-Final Office Action.
U.S. Appl. No. 14/546,151, Sep. 7, 2017 Response to Restriction Requirement.
U.S. Appl. No. 14/546,151, Jul. 10, 2017 Restriction Requirement.

* cited by examiner

FIG. 2

```
                FTW                    OaSwitch                    DlgSvr's
                 ─────────────────────────▶
    301 ─── MESSAGE_TYPE.s = "REQ_CFG"
            CFG_REQUEST.DIALOG.s =
            "omar_Dlg.ClientOrderDialog"

──────────────────────────▶
                                          To WO.OMAR_DLG                    ─── 302
                                          MESSAGE_TYPE.s = "REQ_CFG"
                                          CFG_REQUEST.DIALOG.s =
                                          "omar_Dlg.ClientOrderDialog"

◀──────────────────────────
                                          MESSAGE_TYPE.s = "REP_CFG" ─── 303
                                          ...

◀─────────────────────────
    304 ───        MESSAGE_TYPE.s = "REP_CFG"
                   ...

─────────────────────────▶
    305 ─── MESSAGE_TYPE.s = "REQ_XMLDIALOG"
            DIALOG.NAME.s =
            "omar_Dlg.ClientOrderDialog"
            ...
            CONTROLS.INSTRUMENT_CODE.VALUE.s=
            "BCA_FHZ.HF"
            ...

◀─────────────────────────
    306 ─── MESSAGE_TYPE.s = "REQ_XMLDIALOG"
            DIALOG.NAME.s =
            "omar_Dlg.ClientOrderDialog"
            DIALOG.NEW_NAME.s =
            "omar_Dlg.ClientOrderDialog__HK"
            ...
            CONTROLS.INSTRUMENT_CODE.VALUE.s=
            "BCA_FHZ.HF"

─────────────────────────▶
    307 ─── MESSAGE_TYPE.s = "REQ_CFG"
            CFG_REQUEST.DIALOG.s =
            "omar_Dlg.ClientOrderDialog__HK"

──────────────────────────▶
                                          To HK.OMAR_DLG                    ─── 308
                                          MESSAGE_TYPE.s = "REQ_CFG"
                                          CFG_REQUEST.DIALOG.s =
                                          "omar_Dlg.ClientOrderDialog"
```

SWITCHING LAYER FOR TRADING ON GLOBAL MARKETS

CROSS-REFERENCE TO RELATED APPLICATIONS

This application is a continuation of U.S. patent application Ser. No. 14/546,151 filed Nov. 18, 2014 and entitled "SWITCHING LAYER FOR TRADING ON GLOBAL MARKETS," which is related to U.S. Provisional Application Ser. No. 61/905,662, filed Nov. 18, 2013, each of which is incorporated herein by reference in its entirety and from each of which priority is claimed.

BACKGROUND

Brokers often provide access to global markets for traders and clients such that clients submit orders using a messaging protocol, such as FIX, or enter them using a desktop application provided by the broker. For example, brokers can provide a trading platform that allows clients to input orders to the system for routing to a particular exchange or market. When an order is executed, a notice of execution or other confirmation can be routed back to the party from which it originated. Additionally, market information can be provided to clients through the trading platform.

Operation of a global trading system typically includes providing access to multiple markets in a plurality of geographic locations. Regional trading platforms are typically deployed close to each market, for example, to reduce latency. Conventionally, traders wishing to execute a trade on an exchange or in a market in a different geographic region would have the trade executed on his or her behalf by an individual (e.g., by communicating the order via telephone, fax, or other message) having access to a trading platform associated with that region.

Figure 1:
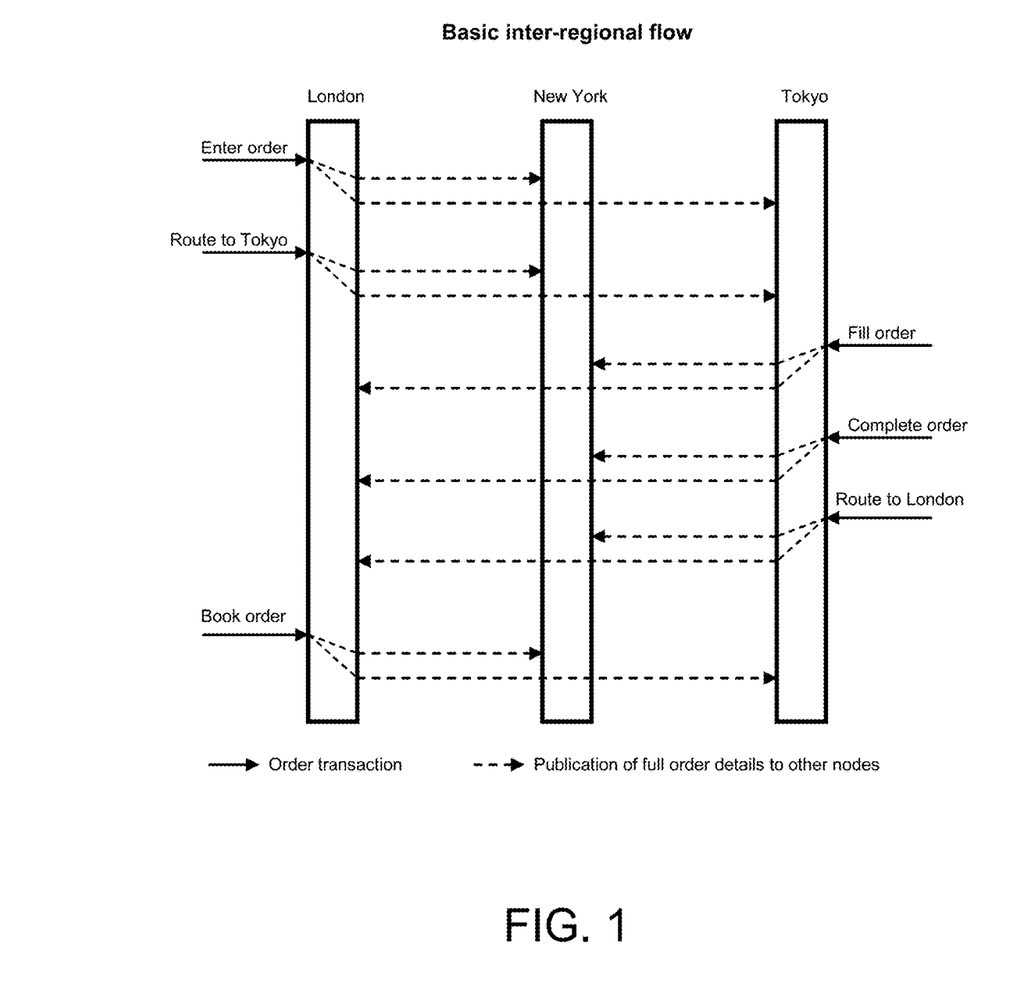
FIG. 1 is a flow diagram illustrating basic inter-regional trade order flow in a global trading system that uses inter-regional electronic messages.

More recently, systems have been developed that allow a user to access each regional market using a single system using a "replicated scheme," such as depicted in FIG. 1. In the system depicted in FIG. 1, a user can connect to a regional system which is closely coupled to other regional systems. That is, the functions of each regional trading node must be replicated in each of the other regional trading nodes to expose functionality to all users. For example, updates or changes to the software of the trading platform at each node (e.g., the addition of different order types and corresponding changes to the user interface) must be made to each end user's device (e.g., by installing updates or new software every time a trading platform is updated). Moreover, in such a system, data (including orders from user applications at each trading node) must be replicated in each regional trading node.

SUMMARY

The presently disclosed subject matter provides techniques for order management and routing in a global trading system, including techniques for order routing and execution management using a global switching layer.

In accordance with the disclosed subject matter a global trading system can include a plurality of trading nodes. Each trading node can be associated with one or more markets and each node can be configured to provide market access to each market associated with a node in the system. Each trading node can be connected, via a network, to a global switching layer. The global switching layer can route requests, such as orders and the like, from an end user associated with one of the plurality of nodes to a corresponding exchange or market. The global switching layer can be configured to dynamically provide, to each end user, a user interface element corresponding to each trading node. In this manner, data for each market need not be copied globally onto each node, and the end user interface need not be updated with changes to the trading platform of a trading node.

In one aspect of the disclosed subject matter, a system for managing and routing market orders across a plurality of trading nodes can include a first trading node communicatively coupled to a first exchange. The first node can include a storage device for storing one or more configuration files corresponding to the first exchange's functionality. The first trading node can be adapted to receive and manage orders corresponding to the first exchange. The system can include at least a second trading node communicatively coupled to a second exchange, having a storage device with one or more configuration files corresponding to the second exchange's functionality. The second trading node can be adapted to receive and manage orders corresponding to the second exchange. The system can include a switching layer, communicatively coupled to the first trading node and the second trading node, adapted to identify data from one or more of the configuration files of the first or second trading node in response to a request from one or more user devices and route said data to the one or more user devices in response to the request. The switching layer can be adapted to receive market order requests, generated by the user devices using the data from the one or more configuration files of the first or second trading node, and route the market order requests to the first or second trading nodes.

In certain embodiments, the switching layer can be adapted to identify the data from the one or more configuration files of the first or second trading nodes by extracting instrument identification codes or location identification codes from the request. Additionally or alternatively, the switching layer can be further adapted to transform the data from one or more of the configuration files of the first or second trading node into a predetermined format which is readable by the one or more user devices. In certain embodiments, the predetermined format can an eXtensible Markup Language.

In certain embodiments, one of the configuration files of the first or second trading nodes can include data for rendering a generic order dialog at the one or more user devices. One of the configuration files of the first trading node can include data for rendering an order dialog having fields corresponding to a particular financial instrument. One of the configuration files of the first trading node can include data for rendering an order dialog having fields corresponding to the functionality of the first exchange.

In certain embodiments, the switching layer can be adapted to route market order requests corresponding to the first exchange to the first trading node and route market order requests corresponding to the second exchange to the second trading node. The system can further include a server, communicatively coupled to the global switching layer, including a global data architecture component for storing instrument identification codes and location identification codes corresponding to markets for financial instruments on the first and second exchanges. The switching layer can be adapted to route market order requests using the global data architecture component by extracting instrument identification codes or location identification codes from the market order requests.

In certain embodiments, the switching layer can be adapted to receive queries to view orders and trades from the one or more end user devices, route the queries to each of the first and second trading nodes, and combine results received from the first and second trading nodes to provide a single result set for the one or more end user devices. The switching layer can be adapted to route the queries to the first and second trading nodes using the global data architecture component by extracting instrument identification codes or location identification codes from the queries.

In another aspect of the disclosed subject matter, a method for managing and routing market orders across a plurality of trading nodes can include storing one or more configuration files corresponding to a first exchange's functionality at a first trading node and storing one or more configuration files corresponding to a second exchange's functionality at a second trading node. The method can include identifying, at a switching layer, data from one or more of the configuration files of the first or second trading node in response to a request from one or more user devices and routing, with the switching layer, said data to the one or more user devices in response to the request. The method can include receiving, at the switching layer, market order requests generated by the user devices using the data from the one or more configuration files of the first or second trading node, and routing, with the switching layer, the market order requests to the first or second trading nodes.

In certain embodiments, identifying the data from the one or more configuration files of the first or second trading nodes can include extracting instrument identification codes or location identification codes from the request. Additionally or alternatively, the method can include transforming, at the switching layer, the data from one or more of the configuration files of the first or second trading node into a predetermined format which is readable by the one or more user devices. In certain embodiments, the predetermined format can an eXtensible Markup Language.

In certain embodiments, one of the configuration files of the first or second trading nodes can include data for rendering a generic order dialog at the one or more user devices. Additionally or alternatively, one of the configuration files of the first trading node can include data for rendering an order dialog having fields corresponding to a particular financial instrument. Additionally or alternatively, one of the configuration files of the first trading node includes data for rendering an order dialog having fields corresponding to the functionality of the first exchange.

In certain embodiments, the method can further include routing market order requests corresponding to the first exchange to the first trading node and route market order requests corresponding to the second exchange to the second trading node. The method can include storing, using a global architecture component at a server, instrument identification codes and location identification codes corresponding to markets for financial instruments on the first and second exchanges. The instrument identification codes or location identification codes can be extracted from the market order requests and routing market order requests using the global data architecture component.

In certain embodiments, the method can further include receiving queries to view orders and trades from the one or more end user devices, routing the queries to each of the first and second trading nodes, and combining results received from the first and second trading nodes to provide a single result set for the one or more end user devices. Routing the queries to the first and second trading nodes can include extracting instrument identification codes or location identification codes from the queries and routing the queries using the global data architecture component.

In another aspect of the disclosed subject matter, a method for placing orders across a plurality of exchanges from a user device can include displaying an interface element to a user adapted to accept user input indicating an exchange for which a user desires to place an order. The method can include requesting, via a switching layer, data from one or more configuration files corresponding to a first exchange in response to user input indicating the first exchange. The method can include rendering and displaying a first order entry dialog to a user, based on the data from the one or more configuration files corresponding to the first exchange, adapted to accept user input corresponding to a first order, and transmitting to a first trading node associated with the first exchange, via the switching layer, the first order. The method can include requesting, via the switching layer, data from one or more configuration files corresponding to a second exchange in response to user input indicating the second exchange. The method can include rendering and displaying a second order entry dialog to a user, based on the data from the one or more configuration files corresponding to the second exchange, adapted to accept user input corresponding to a second order, and transmitting to a second trading node associated with the second exchange, via the switching layer, the second order.

BRIEF DESCRIPTION OF THE DRAWINGS

FIG. 3 is an exemplary message flow between an end user application, a switching layer, and a dialog server in accordance with an exemplary embodiment of the disclosed subject matter.

Throughout the drawings, the same reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Exemplary embodiments of the disclosed subject matter are described below, with reference to the figures, for purposes of illustration, and not limitation.

In one aspect of the disclosed subject matter, systems and methods for managing and routing market orders across a plurality of trading nodes can include a first trading node communicatively coupled to a first exchange. The first node can include a storage device for storing one or more configuration files corresponding to the first exchange's functionality. The first trading node can be adapted to receive and manage orders corresponding to the first exchange. The system can include at least a second trading node communicatively coupled to a second exchange, having a storage device with one or more configuration files corresponding to the second exchange's functionality. The second trading node can be adapted to receive and manage orders corresponding to the second exchange, The system can include a switching layer, communicatively coupled to the first trading node and the second trading node, adapted transform data from one or more of the configuration files of the first or second trading node into a predetermined format which is readable by one or more user devices and route the data to the one or more user devices in response to a request from said one or more user devices. The switching layer can be adapted to receive market order requests, generated by the user devices using the one or more configuration files of the first or second trading node, and route the market order requests to the first or second trading nodes.

In another aspect of the disclosed subject matter, systems and methods for placing orders across a plurality of exchanges from a user device can include displaying an interface element to a user adapted to accept user input indicating an exchange for which a user desires to place an order. The method can include requesting, via a switching layer, data from one or more configuration files corresponding to a first exchange in response to user input indicating the first exchange. The method can include rendering and displaying a first order entry dialog to a user, based on the data from the one or more configuration files corresponding to the first exchange, and which is adapted to accept user input corresponding to a first order, and transmitting the first order to a first trading node associated with the first exchange, via the switching layer. The method can include requesting, via the switching layer, data from one or more configuration files corresponding to a second exchange in response to user input indicating the second exchange. The method can include rendering and displaying a second order entry dialog to a user, based on the data from one or more configuration files corresponding to the second exchange, and which is adapted to accept user input corresponding to a second order, and transmitting the second order to a second trading node associated with the second exchange, via the switching layer.

Certain exemplary and non-limiting embodiments of the disclosed subject matter will be described below. It should be apparent, however, to those skilled in the art that many more modifications besides those described herein are possible without departing from the concepts of the disclosed subject matter.

Figure 2:
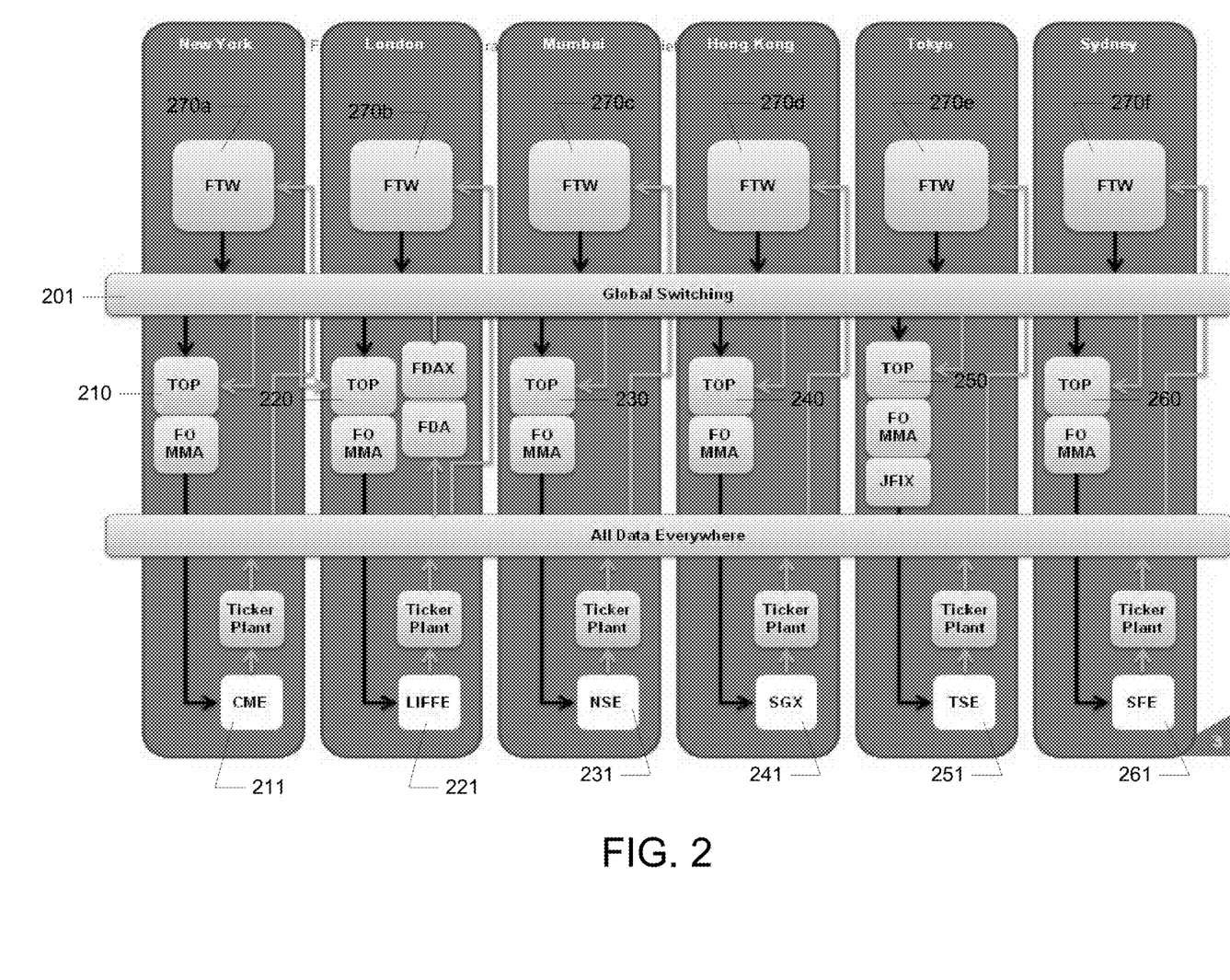
FIG. 2 is a schematic diagram illustrating a representative geographical deployment of a global switching layer in a global trading system in accordance with an embodiment of the disclosed subject matter.

In an exemplary embodiment, with reference to FIG. 2 for purpose of illustration and not limitation, a global trading system in accordance with the disclosed subject matter can include trading nodes in a plurality of geographic locations. Each geographic location can include a particular market or exchange. For example, trading nodes can exist in New York 210 (associated with the Chicago Mercantile Exchanges, or CME 211), London 220 (associated with the London International Financial Futures and Options Exchange, or LIFFE 221), Mumbai 230 (associated with the National Stock Exchange of India, or NSE 231), Hong Kong 240 (associated with the Singapore Exchange, or SGX 241), Tokyo 250 (associated with the Tokyo Stock Exchange, or TSE 251), and Sydney 260 (associated with the Sydney Futures Exchange, or SFE 261). One of skill in the art will appreciate that although the trading node 210 associated with CME 211 is depicted in FIG. 2 as located in New York, such a trading node could also be located in another geographic region, such as Chicago, for example where low latency is desired. Additionally, one of skill in the art will appreciate that the locations and exchanges depicted in FIG. 2 are merely exemplary, and that a variety of other locations and markets/exchanges may be used. Each trading node can interface with a global switching layer 201 which routes requests associated with each of the exchanges to one or more nodes. Each trading node can be configured to interface with one or more end user applications (270a through 270f) adapted for receiving input from a user. The global switching layer 201 is configured to cause each end user application to display an entry dialog corresponding to the trading node on which the user's order will be processed.

An exemplary end user application can be configured to display an entry dialog which is common to each trading node. That is, for example, a uniform entry dialog that includes fields or other interface elements that are common to each trading node can be displayed. The entry dialog can be configured to behave differently depending on the trading node it is ultimately connected to, thus exposing the functionality of each regional trading node. In this manner, the global switching layer can decouple the upgrading of trading applications (i.e., a portion of the trading platform at the regional trading nodes) from front end user applications. For example, a user in London may have access to trading nodes in London and Chicago. The trading platform in Chicago can be upgraded to introduce some new functionality which relies on displaying to a user a dialog having a new data field. In accordance with the disclosed subject matter, the user in London can take advantage of the new functionality in Chicago without the need to upgrade his or her user application.

In accordance with an exemplary embodiment of the disclosed subject matter, the end user application can include a thin UI component, which can be configured to render a configuration downloaded from a server associated with the system. A configuration for each trading node can be stored, for example, as an eXtensible Markup Language (XML) file. The end user application, in response to an action by an end user corresponding to a particular trading node, can be configured to query the server for a configuration associated with that trading node. The server can be adapted to send the configuration file corresponding to that trading node, and the end user application can be adapted to render the configuration for that trading node. In this manner, any defaulting or validation action on the UI can involve communication with software running on the relevant trading node. The switching layer can route each request to the correct trading node in a manner which is invisible to the UI.

For purpose of illustration and not limitation, with reference to FIG. 3, an exemplary description of communication between the end user application and the trading node is provided. An end user application (such as Fidessa Trader Workstation) can be adapted to send a message (301) to the switching layer requesting a configuration for a first client order dialog corresponding to a first trading node. The first trading node can be, for example, the local trading node. The switching layer can route (302) the request to an appropriate trading node. For example, as depicted in FIG. 3, the switching layer can route a request for a client order dialog from an end user application associated with local trading node "WO" to a dialog server associated with trading node WO. The dialog server can send (303) a response back to the switching layer including information about the configuration, and the switching layer can route (304) the response back to the end user application. The thin UI component can render the first dialog and receive input from the end user.

Responsive to an end user action, the end user application can also be adapted to send (305) a message to the switching layer indicating the current dialog displayed as well as context information, such as an instrument code or order ID corresponding to an order entered or identified by the user. For example, as depicted in FIG. 3, the user may enter an instrument code "BCA_FHZ.HF," corresponding to an instrument associated with trading node "HK." The switching layer can be adapted to respond (306) with an indication of a new dialog associated with the trading node corresponding to the instrument code. For example, as depicted in FIG. 3, the switching layer can respond with a message including a parameter "DIALOG.NEW_NAME.s='omar_Dlg.ClientOrderDialog_HK.'" The end user application can be adapted to send (307) a message to the switching layer requesting a configuration corresponding to the new dialog. The switching layer can route (308) the message to an appropriate trading node. For example, as illustrated by FIG. 3, the switching layer can route the message to trading node "HK." A dialog server associated with trading node HK can respond with a message including information about the configuration for trading node HK.

Figure 5:
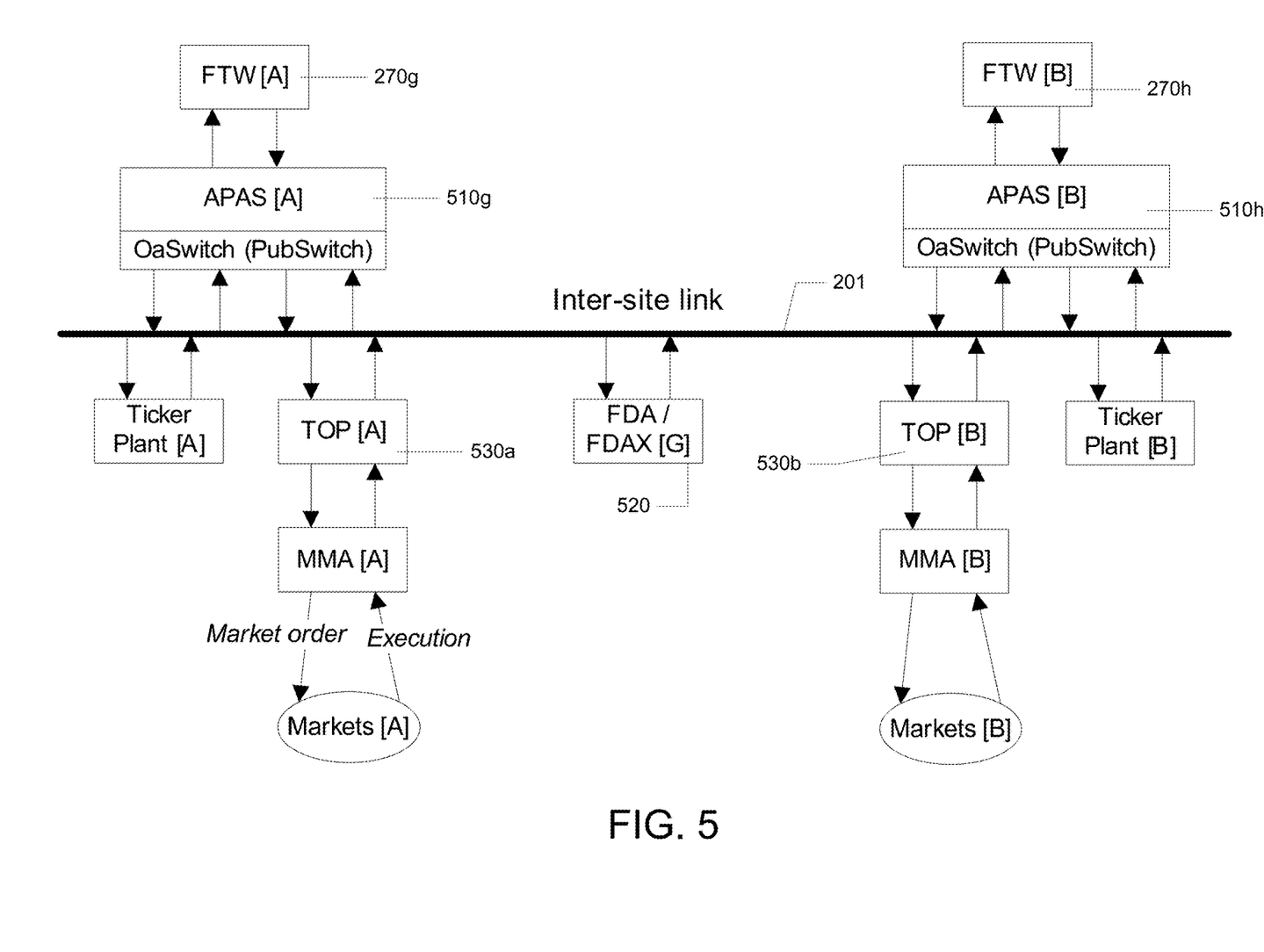
FIG. 5 is a schematic diagram illustrating two trading nodes that share a global repository for static data in accordance with an embodiment of the disclosed subject matter.

In accordance with an exemplary embodiment, with reference to FIG. 5 and for purpose of illustration and not limitation, each trading node can include Authenticated Passwords and Security (APAS) to manage connections from users (270g and 270h) in the same geographical region. The routing of front-end requests can be provided by one or more processes on the APAS server (510h and 510h). Shared user and counterparty information can be provided by a global data architecture component, such as the Fidessa Data Architecture product (FDA) 520. The global architecture component can be hosted on one or more servers, and can be communicatively coupled to the switching layer. Alternatively, in certain embodiments, the global architecture component need not be communicatively coupled to the switching layer. The global architecture component can be adapted to store and pass common data to all trading nodes. Associated baseline data such as currencies, countries and exchange data, along with customer data such as books, can be maintained by the data architecture component and downloaded to every trading node. Instruments for all markets can be managed by the data architecture component and also can be downloaded to every trading node. FIG. 5 depicts an exemplary embodiment of the disclosed subject matter, showing two trading nodes (530a and 530b) sharing a global repository (520) for static data.

Figure 4:
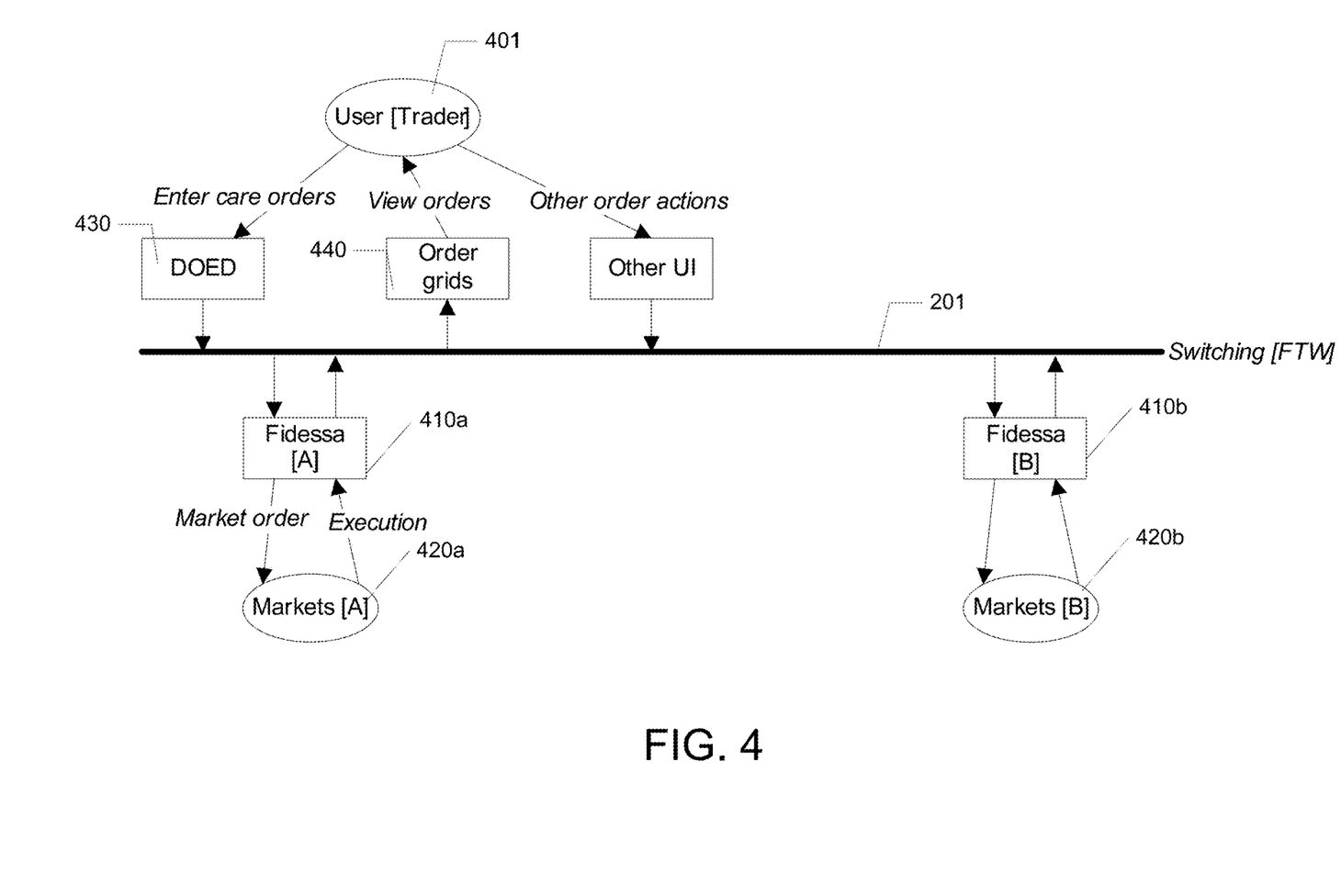
FIG. 4 is a schematic diagram illustrating exemplary functionality of a global trading system including a switching layer in accordance with an embodiment of the disclosed subject matter.

In accordance with this exemplary embodiment, and with reference to FIG. 4, a switching layer 201 routes requests for data to the appropriate node (410a or 410b) based on the type of data requested. For example, requests that create a new order 430 are routed to the node that has the market (420a or 420b) connection where the ordered instrument is traded. A connection to a market can be provided by only one node in the global trading system. For an existing order 440 the request can be routed to the node that created it, e.g., via an order identifier including a location code. The end user 401 is able to interact with an order in the same way irrespective of the node on which the order is stored. For viewing purposes, the orders from all nodes can be combined so they can be viewed on the same tabular display in the user interface.

In connection with an exemplary embodiment of the disclosed subject matter, where a request from an end user's application (such as, for example and not limitation, Fidessa Trader Workbench) needs to be sent to a specific node, the following routing logic can be employed:

(1) By location code in an internal ID: The identifier used for entities such as orders and trades managed by an application server in a node can contain a unique location identifier. When an end user request includes an order or trade identifier, the location code can be extracted from the identifier and used to route the request to the correct node.

(2) By instrument identification code suffix: Requests from end users' applications can identify the instrument using a unique identification code, such as a Fidessa Instrument Mnemonic (FIM) or the like. The suffix of this code can be extracted and mapped to a location (i.e., the suffix can include an exchange identifier which can be used by the global switching layer for routing to the appropriate exchange), for example using a configuration file stored on the APAS server.

All other requests can either be routed to all nodes to build a combined view or routed to the local node.

In connection with this exemplary embodiment, market data for any market connected to the global trading system can be served irrespective of its geographical location. That is, for example, market data need not be routed by the switching layer. For example, and not limitation, market data can be cached to avoid duplication and to facilitate quality of service (QoS) policy implementation and monitoring.

In accordance with an exemplary embodiment, queries to view orders and trades can be sent to all locations and the results can be combined by the switching layer associated with the APAS to give a single result set for the end user's application user interface (referred to herein, for example and not limitation, as the user's application, client application, front-end, and/or FTW). Each trading node in each region can supply its own set of regional dialogs, which can be downloaded and rendered on the end users' application. In this manner, the end user need not actually install the user interface component on his device, so changing just one trading node in one region can affect the user interface for all users globally. Additionally, for example, permission checks can be applied by each node separately to determine which rows a user can view. To allow market status information to be viewed in all locations, this query can also be routed to all locations, while other static and/or reference data are routed to the local node only. The sharing of global static and market data can ensure that these queries can be satisfied by the local node.

For purpose of illustration, and not limitation, "publish/subscribe" is a paradigm for broadcasting and retrieving real-time information for display to an end-user. Such a communication technique can use a short character string identifier known as a subject name for each individual data item, for example, an order ID or instrument identifier. In accordance with an exemplary embodiment of the disclosed subject matter, and as with transactional flows, these identifiers can be used by the switching layer to route a request to the relevant trading node. Subject names which do not contain such an identifier can be routed to the node local to the client. For example, the description for a counterparty organization can be assumed to be available because a consistent set of reference data is globally shared across all nodes.

Transactions can be routed to a location using the appropriate routing scheme (ID location or FIM) depending on the type of transaction performed. Other transactions can be routed everywhere (such as "pull all orders"), but can be configured, by default, to be routed to the local node. Request/replies (e.g., stateless, ad hoc, requests for a snapshot of some data and/or to invoke some stateless action) can be routed in the same manner as transactions. Additionally or alternatively, some request/replies can be routed in a similar manner as publications that provide static data. For example, a request to default a settlement date can be assumed to be handled locally as a result of the shared static data.

Figure 6:
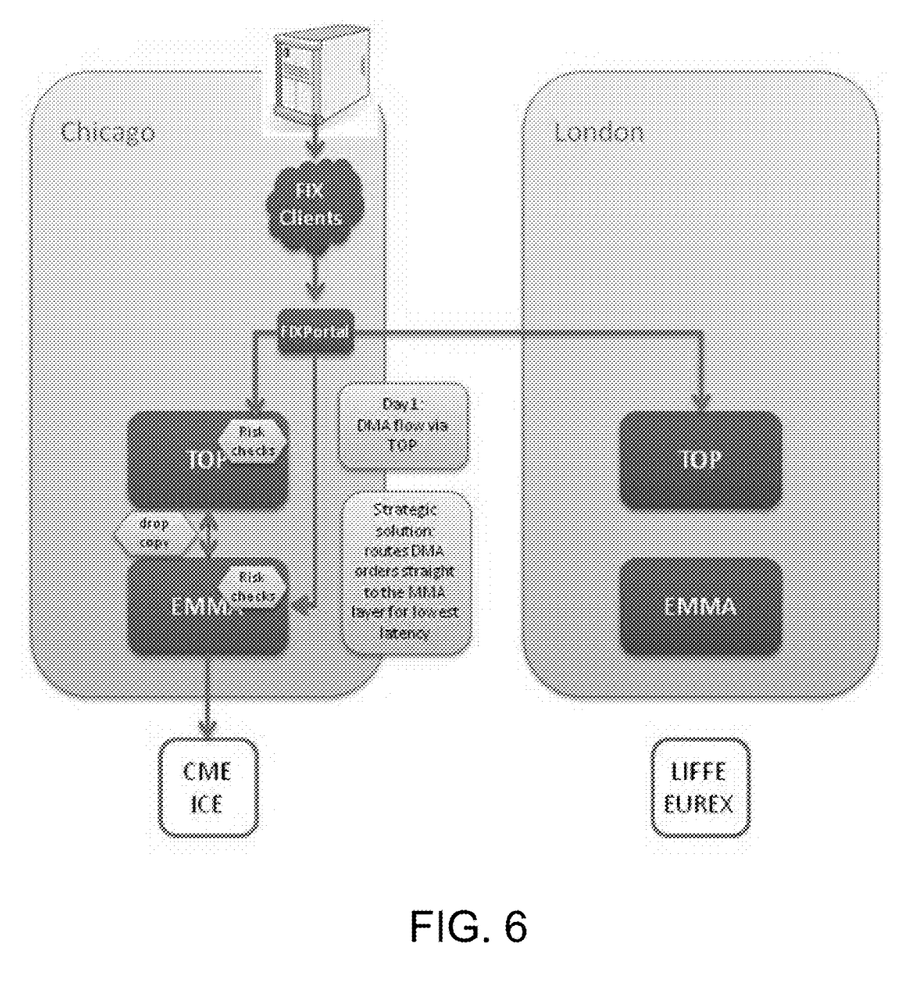
FIG. 6 is a schematic diagram illustrating an exemplary electronic order flow in accordance with an embodiment of the disclosed subject matter.

For purpose of illustration and not limitation, electronic order flow in accordance with the disclosed subject matter will be described with reference to FIG. 6. In this example, an end user in Chicago may communicate with a trading node in that geographic area using a stateless communication protocol. For orders to be routed to the CME or ICE, the trading node in Chicago can check risks and perform other functions associated with providing market access. For low latency, orders can be routed straight to the MMA server and to the desired exchange. For orders to be routed to LIFFE or EUREX (associated with the London trading node), the Chicago trading node can route messages to the London trading node for similar risk checks and other required direct market access processing.

Figure 7:
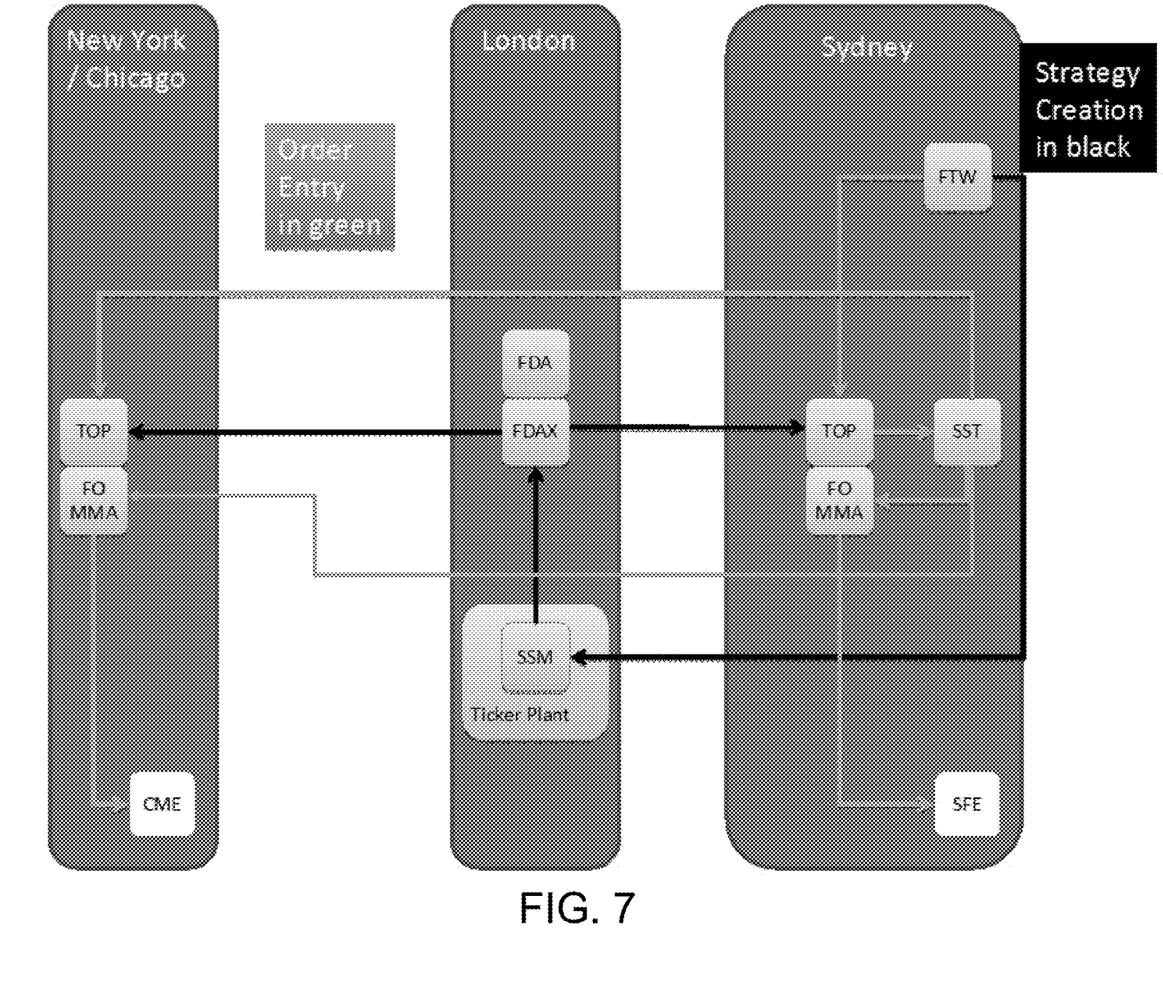
FIG. 7 is a schematic diagram illustrating an exemplary synthetic strategy order flow in accordance with an embodiment of the disclosed subject matter.

For purpose of illustration and not limitation, synthetic strategy order flow in accordance with the disclosed subject matter will be described with reference to FIG. 7. Conventionally, because of different trading platforms at each trading node, orders of a synthetic strategy needed to be created on the trading platform corresponding to the exchange to which they are submitted. For example, synthetic strategies can require that an order be traded simultaneously on more than one node such that the order needs to be in multiple locations. This can require multiple messages between trading nodes. In accordance with the disclosed subject matter and with reference to FIG. 7, however, a synthetic order can be created in one or more remote nodes closest to the exchanges where the synthetic strategy will be trading without the overhead required by inter-regional electronic messaging systems. That is, for example, the switching layer can allow for the copying of data between nodes where needed, and can further be adapted to reduce the amount of data that needs to be copied between nodes by, for example, determining one or more nodes on which to create the synthetic strategy.

The disclosed subject matter can allow for users to trade on multiple trading platforms in different geographical regions, without regard to where they are located. The techniques disclosed herein can route user actions to trade financial instruments to the trading platform in the region that supports that instrument and can aggregate information from each region to display to users. These techniques can be employed without the need for updating of end user trading software.

As described above in connection with certain embodiments, certain components, e.g., switching layer 201, trading nodes 210, 220, 230, 240, 250, and 260, end user devices 270a-270f, and server 520 can include a computer or computers, processor, network, mobile device, cluster, or other hardware to perform various functions. Moreover, certain elements of the disclosed subject matter can be embodied in computer readable code which can be stored on computer readable media and which when executed can cause a processor to perform certain functions described herein. In these embodiments, the computer and/or other hardware play a significant role in the systems and methods disclosed herein. For example, the presence of the computers, processors, memory, storage, and networking hardware provides the ability for users to trade on multiple trading platforms in different geographical regions, without regard to where they are located.

Additionally, as described above in connection with certain embodiments, certain components can communicate with certain other components, for example via a network, e.g., the internet. To the extent not expressly stated above, the disclosed subject matter is intended to encompass both sides of each transaction, including transmitting and receiving. One of ordinary skill in the art will readily understand that with regard to the features described above, if one component transmits, sends, or otherwise makes available to another component, the other component will receive or acquire, whether expressly stated or not.

The presently disclosed subject matter is not to be limited in scope by the specific embodiments herein. Indeed, various modifications of the disclosed subject matter in addition to those described herein will become apparent to those skilled in the art from the foregoing description and the accompanying figures. Such modifications are intended to fall within the scope of the appended claims.

The invention claimed is:

1. A system for managing and routing market orders across a plurality of trading nodes, comprising:
   a first trading node communicatively coupled to a first exchange having a first functionality, comprising a storage device having stored thereon one or more configuration files corresponding to the first functionality, the first trading node configured to receive and manage orders corresponding to the first exchange;
   at least a second trading node communicatively coupled to a second exchange having a second functionality, comprising a storage device having stored thereon one or more configuration files corresponding to the second functionality, the second trading node configured to receive and manage orders corresponding to the second exchange;
   a computer processor, communicatively coupled to the first trading node and the second trading node, configured to:
     identify functionality data from one or more of the configuration files of the first or second trading node;
     route the identified functionality data to one or more user devices;
     receive market order requests, generated by the user devices using the functionality data from the one or more configuration files of the first or second trading node;
     route the market order requests to the first or second trading nodes based on a unique location code extracted from the market order request or trade identifier; and
   wherein the system is configured to:
     access a plurality of regional trading nodes such that the first trading node and the second trading node are each associated with a different exchange across a plurality of geographic locations, and display, on the one or more user devices, at least one of a first entry dialog corresponding to the first functionality and a second entry dialog corresponding to the second functionality.

2. The system of claim 1, wherein the computer processor is further configured to:
receive, from one or more end user devices, a message indicating the current dialog displayed;
transmit, to one or more end user devices, an indication of a new dialog associated with one or more trading nodes;
receive, from one or more end user devices, a request for a configuration corresponding to the new dialog;
receive, from a dialog server associated with one or more trading nodes, information about said configuration of said one or more trading nodes;
determine one or more trading nodes on which to create one or more synthetic strategies, wherein the one or more synthetic strategies are created in the one or more trading nodes closest to one or more trading exchanges on which each of the one or more synthetic strategies will be traded; and
produce a combined result set for transmission to one or more end user devices in response to one or more queries, the combined result set including one or more sets of regional dialogs generated by one or more trading nodes.

3. The system of claim 1, further comprising:
a global data architecture component communicatively coupled to the computer processor, configured to provide, to one or more end user devices, a user interface element corresponding to each of the one or more trading nodes, wherein the global data architecture component is further configured to store common data, including data related to currencies, countries, exchanges, and customers, and to communicate such data to one or more trading nodes, via the computer processor.

4. The system of claim 1, wherein the computer processor is configured to identify the data from the one or more configuration files of the first or second trading nodes by extracting instrument identification codes or location identification codes from the request.

5. The system of claim 1, wherein the computer processor is further configured to transform the data from one or more of the configuration files of the first or second trading node into a predetermined format which is readable by the one or more user devices.

6. The system of claim 5, wherein the predetermined format is an eXtensible Markup Language.

7. The system of claim 1, wherein at least one of the configuration files of the first or second trading nodes includes data for rendering a generic order dialog at the one or more user devices.

8. The system of claim 1, wherein at least one of the configuration files of the first trading node includes data for rendering an order dialog having fields corresponding to a particular financial instrument.

9. The system of claim 1, wherein at least one of the configuration files of the first trading node includes data for rendering an order dialog having fields corresponding to the functionality of the first exchange.

10. The system of claim 1, wherein the computer processor is further configured to route market order requests corresponding to the first exchange to the first trading node and route market order requests corresponding to the second exchange to the second trading node.

11. The system of claim 10, further comprising the global data architecture component storing instrument identification codes and location identification codes corresponding to markets for financial instruments on the first and second exchanges.

12. The system of claim 11, wherein the computer processor is further configured to route market order requests using the global data architecture component by extracting instrument identification codes or location identification codes from the market order requests.

13. The system of claim 10, wherein the computer processor is further configured to receive queries to view orders and trades from the one or more end user devices, route the queries to each of the first and second trading nodes, and combine results received from the first and second trading nodes to provide a single result set for the one or more end user devices.

14. The system of claim 13, wherein the computer processor is configured to route the queries to the first and second trading nodes using the global data architecture component by extracting instrument identification codes or location identification codes from the queries.

15. A method for managing and routing market orders across a plurality of trading nodes, comprising:
storing one or more configuration files corresponding to a first functionality at a first trading node;
storing one or more configuration files corresponding to a second functionality at a second trading node;
identifying, at a switching layer, functionality data from one or more of the configuration files of the first or second trading node;
routing, with the switching layer, said data to one or more user devices;
receiving, at the switching layer, market order requests generated by the user devices using the data from the one or more configuration files of the first or second trading node;
routing, with the switching layer, the market order requests to the first or second trading nodes based on a unique location code extracted from an order or trade identifier;
accessing a plurality of regional trading nodes such that the first trading node and the second trading node are each associated with a different exchange across a plurality of geographic locations; and
displaying, on the one or more user devices, at least one of a first entry dialog corresponding to the first functionality and a second entry dialog corresponding to the second functionality.

16. The method of claim 15, further comprising:
receiving, at the switching layer, from one or more end user devices, a message indicating the current dialog displayed;
transmitting, to one or more end user devices, an indication of a new dialog associated with one or more trading nodes;
receiving, from one or more end user devices, a request for a configuration corresponding to the new dialog;
receiving, from a dialog server associated with one or more trading nodes, information about said configuration of said one or more trading nodes;
determining, by the switching layer, one or more trading nodes on which to create one or more synthetic strategies, wherein the one or more synthetic strategies are created in the one or more trading nodes closest to one or more trading exchanges on which each of the one or more synthetic strategies will be traded; and producing, by the switching layer, a combined result set for transmission to one or more end user devices in response to one or more queries, the combined result set including one or more sets of regional dialogs generated by one or more trading nodes.

17. The method of claim 15, further comprising: providing, with a global data architecture component communicatively coupled to the switching layer, to one or more end user devices, a user interface element corresponding to each of the one or more trading nodes, wherein the global switching layer is further configured to store and communicate common data, including data related to currencies, countries, exchanges, and customers, to one or more trading nodes.

18. The method of claim 15, wherein identifying the data from the one or more configuration files of the first or second trading nodes includes extracting instrument identification codes or location identification codes from the request.

19. The method of claim 15, further comprising transforming, at the switching layer, the data from one or more of the configuration files of the first or second trading node into a predetermined format which is readable by the one or more user devices.

20. The method of claim 19, wherein the predetermined format is an eXtensible Markup Language.

21. The method of claim 15, wherein at least one of the configuration files of the first or second trading nodes includes data for rendering a generic order dialog at the one or more user devices.

22. The method of claim 15, wherein at least one of the configuration files of the first trading node includes data for rendering an order dialog having fields corresponding to a particular financial instrument.

23. The method of claim 15, wherein at least one of the configuration files of the first trading node includes data for rendering an order dialog having fields corresponding to the functionality of the first exchange.

24. The method of claim 15, further comprising routing market order requests corresponding to the first exchange to the first trading node and route market order requests corresponding to the second exchange to the second trading node.

25. The method of claim 24, further comprising storing, using the global architecture component at a server, instrument identification codes and location identification codes corresponding to markets for financial instruments on the first and second exchanges.

26. The method of claim 25, further comprising extracting instrument identification codes or location identification codes from the market order requests and routing market order requests using the global data architecture component.

27. The method of claim 24, further comprising receiving queries to view orders and trades from the one or more end user devices, routing the queries to each of the first and second trading nodes, and combining results received from the first and second trading nodes to provide a single result set for the one or more end user devices.

28. The method of claim 27, wherein routing the queries to the first and second trading nodes includes extracting instrument identification codes or location identification codes from the queries and routing the queries using the global data architecture component.

29. A non-transitory computer-readable medium storing instructions that, when executed by a processor, cause a computer system to manage and route market orders across a plurality of trading nodes, by performing the steps of:
storing one or more configuration files corresponding to a first functionality at a first trading node;
storing one or more configuration files corresponding to a second functionality at a second trading node;
identifying, at a switching layer, functionality data from one or more of the configuration files of the first or second trading node;
routing, with the switching layer, said data to one or more user devices;
receiving, at the switching layer, market order requests generated by the user devices using the data from the one or more configuration files of the first or second trading node; and
routing, with the switching layer, the market order requests to the first or second trading nodes based on a unique location code extracted from an order or trade identifier;
accessing a plurality of regional trading nodes such that the first trading node and the second trading node are each associated with a different exchange across a plurality of geographic locations; and
displaying, on the one or more user devices, at least one of a first entry dialog corresponding to the first functionality and a second entry dialog corresponding to the second a functionality.

30. The non-transitory computer-readable medium of claim 29, further including:
receiving, at the switching layer, from one or more end user devices, a message indicating the current dialog displayed;
transmitting, to one or more end user devices, an indication of a new dialog associated with one or more trading nodes;
receiving, from one or more end user devices, a request for a configuration corresponding to the new dialog;
receiving, from a dialog server associated with one or more trading nodes, information about said configuration of said one or more trading nodes;
determining, by the switching layer, one or more trading nodes on which to create one or more synthetic strategies, wherein the one or more synthetic strategies are created in the one or more trading nodes closest to one or more trading exchanges on which each of the one or more synthetic strategies will be traded;
producing, by the switching layer, a combined result set for transmission to one or more end user devices in response to one or more queries, the combined result set including one or more sets of regional dialogs generated by one or more trading nodes; and
providing, with a global data architecture component communicatively coupled to the switching layer, to one or more end user devices, a user interface element corresponding to each of the one or more trading nodes, wherein the global switching layer is further configured to store and communicate common data, including data related to currencies, countries, exchanges, and customers, to one or more trading nodes.

* * * * *